United States Patent
Williams (10) Patent No.: US 10,225,727 B2
(45) Date of Patent: Mar. 5, 2019

(54) DATA PROCESSING (71) Applicant: METASWITCH NETWORKS LTD., Enfield (GB)

(72) Inventor: Matthew Williams, London (GB)

(73) Assignee: METASWITCH NETWORKS LTD., Enfield (GB)

( * ) Notice: Subject to any disclaimer, the term of this patent is extended or adjusted under 35 U.S.C. 154(b) by 0 days.

(21) Appl. No.: 15/593,701

(22) Filed: May 12, 2017

(65) Prior Publication Data

US 2018/0332461 A1  Nov. 15, 2018

(51) Int. Cl.
| | |
|---|---|
| *H04W 8/04* | (2009.01) |
| *H04L 29/08* | (2006.01) |
| *H04L 29/12* | (2006.01) |
| *H04L 29/06* | (2006.01) |

(52) U.S. Cl.
CPC ............ *H04W 8/04* (2013.01); *H04L 61/203* (2013.01); *H04L 67/101* (2013.01); *H04L 67/1021* (2013.01); *H04L 67/306* (2013.01); *H04L 61/1582* (2013.01); *H04L 65/1016* (2013.01); *H04L 65/1073* (2013.01); *H04L 67/1008* (2013.01)

(58) Field of Classification Search
CPC .................................................... H04W 4/026
USPC ........................................... 455/456.6, 435.1
See application file for complete search history.

(56) References Cited

U.S. PATENT DOCUMENTS

2008/0160996 A1* 7/2008 Li ..................... H04L 41/12
                                                     455/433
2011/0320581 A1   12/2011 Lindholm et al.

FOREIGN PATENT DOCUMENTS

| | | |
|---|---|---|
| EP | 2037658 A1 | 3/2009 |
| WO | 2010072261 A1 | 7/2010 |

OTHER PUBLICATIONS

3GPP: "3rd Generation Partnership Project; Technical Specification Group Core Network and Terminals; IP Multimedia (IM) Subsystem Cx and Dx interfaces; Signalling flows and message contents (Release 14)"; Mar. 16, 2017; Technical Specification; vol. CT WG4, No. V14.2.0, pp. 1-81; France; XP051290532.
3GPP: "3rd Generation Partnership Project; Technical Specification Group Services and Systems Aspects; Feasibility Study on IMS Evolution; (Release 9)"; Nov. 7, 2011; 3GPP Draft; 23.812-120_Clean, XP050575185.
Extended European Search Report dated Sep. 28, 2018 for EP Application No. 18171758.8.

\* cited by examiner

*Primary Examiner* — Chuck Huynh
(74) *Attorney, Agent, or Firm* — EIP US LLP (57) ABSTRACT

Measures (for example methods, systems and non-transitory computer-readable storage media) to process data in an IMS network, including an HSS, an I-CSCF and an S-CSCF. The I-CSCF transmits a request message identifying a user of the IMS network to the HSS. The I-CSCF receives an answer message from the HSS. The answer message comprises an indication either that the user is assigned and not registered to the S-CSCF, or that the user is registered with the S-CSCF. The I-CSCF performs a predetermined action in response to the answer message indicating that the user is assigned to the S-CSCF.

16 Claims, 5 Drawing Sheets

DATA PROCESSING

FIELD

The present disclosure relates to data processing. In particular, but not exclusively, the present disclosure relates to processing data in an IP Multimedia Subsystem (IMS) network.

BACKGROUND

In an IMS network, a user (or 'subscriber') registers a user device (or 'user equipment') with a Serving Call Session Control Function (S-CSCF) to receive service. A Home Subscriber Server (HSS) tracks to which S-CSCF a user is registered by storing a Uniform Resource Identifier (URI) of the S-CSCF against a user identifier, for example a Session Initiation Protocol (SIP) URI of the user. An Interrogating CSCF (I-CSCF) queries the HSS for the URI of the S-CSCF to which a user is registered and routes SIP requests relating to the user to that S-CSCF using the URI of the S-CSCF.

A user may be served by an S-CSCF even when the user is not registered, for example to provide call diversion and/or voicemail services when a device (for example a SIP device) of the user is turned off. In such cases, the user is assigned to the S-CSCF and not registered, rather than being registered with the S-CSCF.

Unlike the subscriber-registration flow to register a user to an S-CSCF, which is standards-mandated, there is no standards-mandated un-assignment flow to un-assign a user from an S-CSCF to which they are assigned.

As such, in a geographically distributed deployment, a user may be assigned to a remote S-CSCF, for example at random, while they are unregistered and then may be registered with the same S-CSCF when they subsequently register. On the one hand, the S-CSCF to which the user was assigned may already have a service profile for the user and therefore need not retrieve the service profile again from the HSS if the user subsequently registers with the S-CSCF. However, on the other hand, the S-CSCF to which the user was assigned may be less preferred for registration than an S-CSCF that is more local to the user, for example because assigning the user to a more local S-CSCF may improve network bandwidth usage and user experience. As such, in some cases it may be desirable for the S-CSCF with which a user is registered to be different from the S-CSCF to which a user had been assigned. When a user is registered to a new S-CSCF, the user is no longer assigned to the previous S-CSCF.

SUMMARY

According to first embodiments, there is a method of processing data in an IP Multimedia Subsystem (IMS) network, the IMS network comprising a Home Subscriber Server (HSS), an Interrogating Call Session Control Function (I-CSCF) and a Serving Call Session Control Function (S-CSCF), the method comprising at the I-CSCF, transmitting a request message to the HSS, the request message identifying a user of the IMS network; at the I-CSCF, receiving an answer message from the HSS, the answer message comprising an indication either that the user is assigned and not registered to the S-CSCF, or that the user is registered with the S-CSCF; and at the I-CSCF, performing a predetermined action in response to the answer message indicating that the user is assigned to the S-CSCF.

According to second embodiments, there is a system for processing data in an IMS network, the IMS network comprising an HSS, an I-CSCF and an S-CSCF, the system comprising at least one memory including computer program code and at least one processor in data communication with the at least one memory, wherein the at least one processor is configured to, at the I-CSCF transmit a request message to the HSS, the request message identifying a user of the IMS network; receive an answer message from the HSS, the answer message comprising an indication either that the user is assigned and not registered to the S-CSCF, or that the user is registered with the S-CSCF; and perform a predetermined action in response to the answer message indicating that the user is assigned to the S-CSCF.

According to third embodiments, there is a non-transitory computer-readable storage medium comprising computer-executable instructions which, when executed by a processor, cause a computing device to perform a method of processing data in an IMS network, the IMS network comprising an HSS, an I-CSCF and an S-CSCF, the method comprising at the I-CSCF, transmitting a request message to the HSS, the request message identifying a user of the IMS network; at the I-CSCF, receiving an answer message from the HSS, the answer message comprising an indication either that the user is assigned and not registered to the S-CSCF, or that the user is registered with the S-CSCF; and at the I-CSCF, performing a predetermined action in response to the answer message indicating that the user is assigned to the S-CSCF.

According to fourth embodiments, there is a method of processing data in an IMS network, the IMS network comprising an HSS, an I-CSCF and an S-CSCF, the method comprising at the S-CSCF, generating a message identifying a user of the IMS network and comprising an indication either that the user is assigned and not registered to the S-CSCF, or that the user is registered with the S-CSCF, wherein the message comprises a URI of the S-CSCF and wherein the indication is comprised in the URI; and at the S-CSCF, transmitting the generated message to the HSS.

According to fifth embodiments, there is a system for processing data in an IMS network, the IMS network comprising an HSS, an I-CSCF and an S-CSCF, the system comprising at least one memory including computer program code and at least one processor in data communication with the at least one memory, wherein the at least one processor is configured to, at the S-CSCF generate a message identifying a user of the IMS network and comprising an indication either that the user is assigned and not registered to the S-CSCF, or that the user is registered with the S-CSCF, wherein the message comprises a URI of the S-CSCF and wherein the indication is comprised in the URI; and transmit the generated message to the HSS.

According to sixth embodiments, there is a non-transitory computer-readable storage medium comprising computer-executable instructions which, when executed by a processor, cause a computing device to perform a method of processing data in an IMS network, the IMS network comprising an HSS, an I-CSCF and an S-CSCF, the method comprising at the S-CSCF, generating a message identifying a user of the IMS network and comprising an indication either that the user is assigned and not registered to the S-CSCF, or that the user is registered with the S-CSCF, wherein the message comprises a URI of the S-CSCF and wherein the indication is comprised in the URI; and at the S-CSCF, transmitting the generated message to the HSS.

Further features will become apparent from the following description, given by way of example only, which is made with reference to the accompanying drawings.

DETAILED DESCRIPTION

Figure 1:
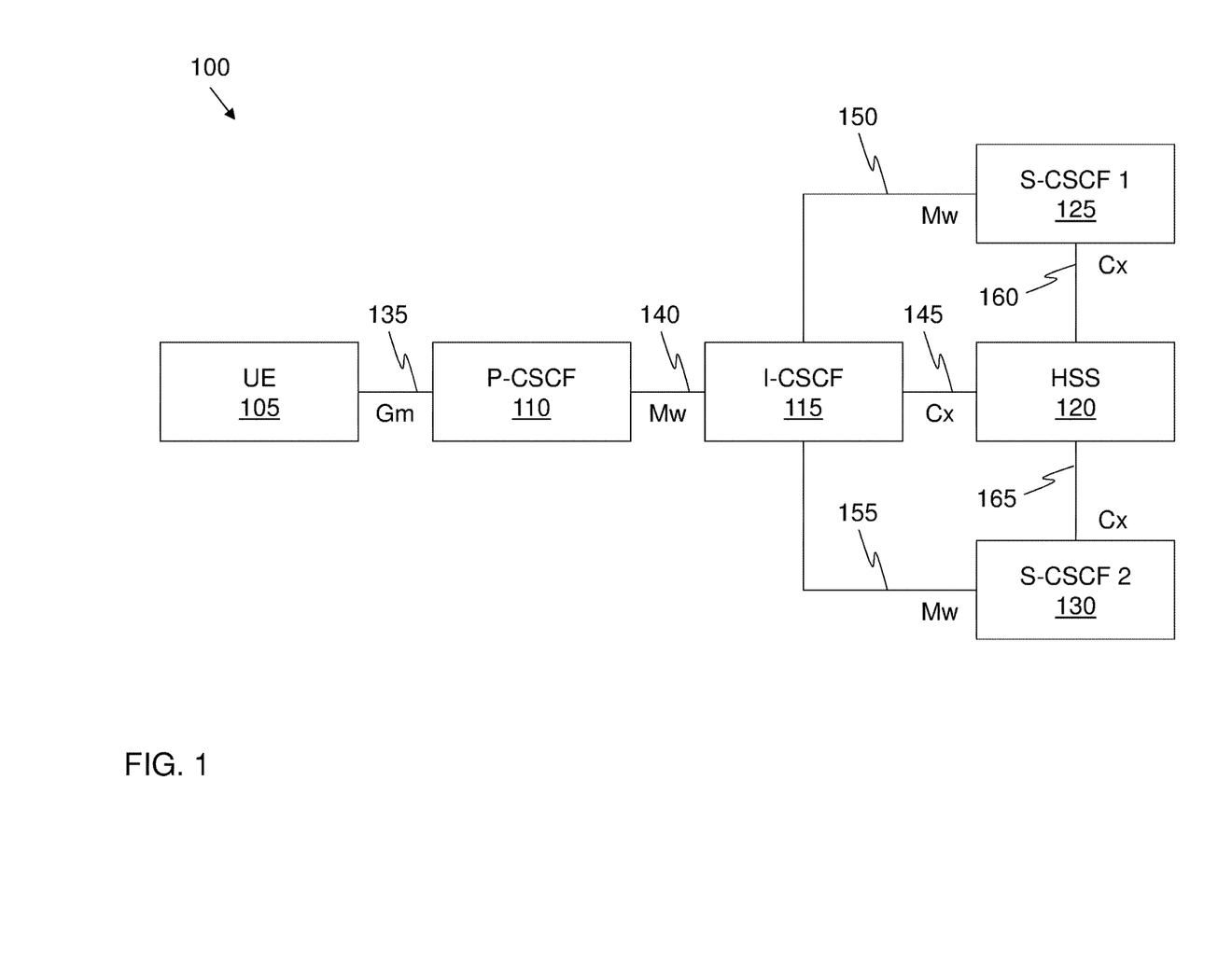
FIG. 1 shows a schematic block diagram of an example of an IMS network.

Referring to FIG. 1, there is shown schematically an example of an IMS network 100.

The IMS network 100 comprises a number of systems. The term "system" is used herein to denote an entity (or entities) in the IMS network 100. A system may be embodied in the form of apparatus, hardware, software, a function, a virtualized resource, etc.

In this example, the IMS network 100 comprises a user equipment (UE) 105, a Proxy CSCF (P-CSCF) 110, an I-CSCF 115, an HSS 120, a first S-CSCF 125 (denoted "S-CSCF 1" in FIG. 1) and a second S-CSCF 130 (denoted "S-CSCF 2" in FIG. 1). An IMS network can comprise at least some different and/or additional components to those shown in FIG. 1.

The UE 105, which is associated with a user of the IMS network 100, accesses the IMS network 100 through the P-CSCF 110, for example via a Gm interface 135 between the UE 105 and the P-CSCF 110. The P-CSCF 110 serves as a proxy for signaling between the UE 105 and other parts of the IMS network 100. The P-CSCF 110 may be located in the home network of the user or may be located in a visited network. The P-CSCF 110 locates the I-CSCF 115 that is to be used for the user and exchanges signaling messages with the I-CSCF 115 via an Mw interface 140 between the P-CSCF 110 and the I-CSCF 115. The I-CSCF 115 exchanges messages with the HSS 120 via a Cx interface 145 between the I-CSCF 115 and the HSS 120 to locate an S-CSCF for the user. The I-CSCF 115 can exchange messages with the first S-CSCF 125 via an Mw interface 150 between the I-CSCF 115 and the first S-CSCF 125. The I-CSCF 115 can also exchange messages with the second S-CSCF 130 via an Mw interface 155 between the I-CSCF 115 and the second S-CSCF 155. The first S-CSCF 125 can exchange messages with the HSS 120 via a Cx interface 160 between the first S-CSCF 125 and the HSS 120. The second S-CSCF 130 can also exchange messages with the HSS 120 via a Cx interface 165 between the second S-CSCF 130 and the HSS 120.

Figure 2:
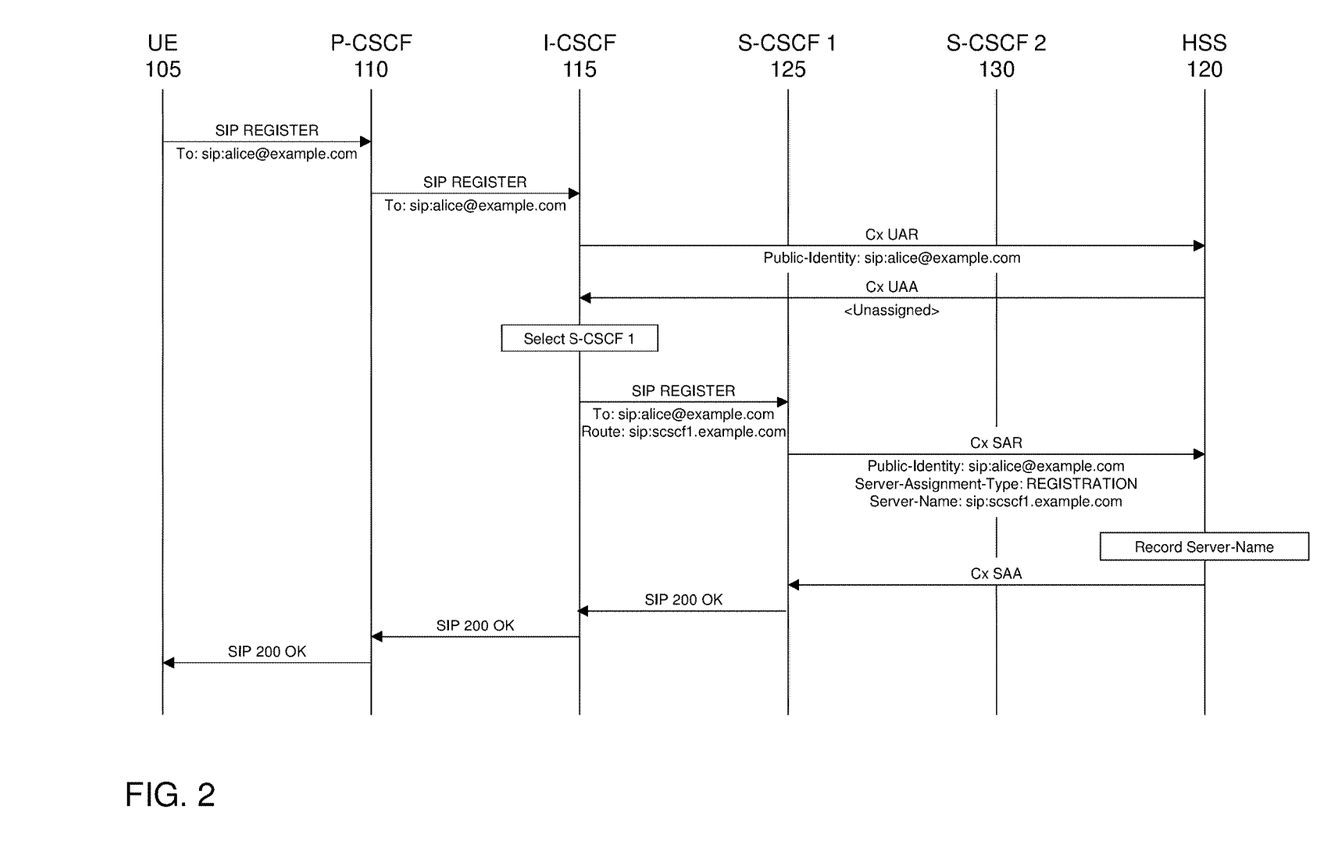
FIG. 2 shows a flow diagram depicting an example of processing data.

Referring to FIG. 2, there is shown an example of processing data. This example is performed in the IMS network 100 described above with reference to FIG. 1.

The example depicted in FIG. 2 may correspond to a known IMS registration flow in which a user goes from being unassigned (and not registered) to being registered. In the unassigned state, the IMS network 100 is aware of the existence of the user, but is not actively providing any services for the user, is not handling any calls involving the user, etc. In the registered state, the UE 105 is powered on and is actively connected to one of the first or second S-CSCFs 125, 130. The user may, for example, make and receive calls via their UE when in the registered state.

The UE 105 sends a SIP REGISTER message to the P-CSCF 110 to initiate registration of the user. The SIP REGISTER message includes a "To" header field which specifies the desired logical recipient of the message. In this example the "To" header field contains a SIP URI of the user, namely sip:alice@example.com. As such, the SIP REGISTER message identifies the user.

The P-CSCF 110 forwards the SIP REGISTER message to the I-CSCF 115.

The I-CSCF 115 queries the HSS 120 by transmitting a request message to the HSS 120. In this example, the request message comprises a Cx User-Authorization-Request (UAR) message (or 'command'). A UAR message is sent to query the assignment status of a user. The UAR message includes a "Public-Identity" Attribute-Value Pair (AVP), which indicates the public identity of the user. In this example the "Public-Identity" AVP contains a SIP URI of the user, namely sip:alice@example.com. As such, the UAR message identifies the user.

The HSS 120 replies to the I-CSCF 115 with an answer message. In this example, the answer message comprises a Cx User-Authorization-Answer (UAA) message (or 'command'). A UAA message is sent in response to a UAR message. In this example, the UAA message omits the Server-Name AVP (denoted "<Unassigned>" in FIG. 2) which indicates that the user has not yet been assigned to a particular S-CSCF.

The I-CSCF 115 selects the first S-CSCF 125 for registration of the user and forwards the SIP REGISTER message to the first S-CSCF 125. The I-CSCF 115 may select the first S-CSCF 125 from amongst the first and second S-CSCFs 125, 130 randomly or in another manner. The SIP REGISTER message sent from the I-CSCF 115 to the first S-CSCF 125 includes a "Route" header field which contains the SIP URI of the first S-CSCF 125, namely sip:scscf1.example.com.

The first S-CSCF 125 sends a request message to the HSS 120. In this example, the request message comprises a Cx Server-Assignment-Request (SAR) message (or 'command'). A SAR message is sent by an S-CSCF to an HSS to request that the HSS assign the user to the S-CSCF by storing the name of the server that is currently serving the user. The SAR message includes a "Public-Identity" AVP which contains the public identity of the user. In this example, the "Public-Identity" AVP contains the SIP URI of the user, namely sip:alice@example.com. As such, the SAR message identifies the user. The SAR message also includes a "Server-Assignment-Type" AVP which indicates the type of server update being performed in the SAR operation. In this example, the "Server-Assignment-Type" AVP contains the value "REGISTRATION", which means that the SAR message is being generated as a first registration of an identity. The SAR message also includes a "Server-Name" AVP which contains a SIP-URI used to identify a SIP server. In this example, the "Server-Name" AVP contains the SIP URI of the first S-CSCF 125, namely sip:scscf1.example.com.

On receiving the Cx SAR message from the first S-CSCF 125, the HSS 120 records the Server-Name of the first S-CSCF 125. The HSS 120 may store the Server-Name of the first S-CSCF 125 against the identity of the user in a database.

The HSS 120 responds to the Cx SAR message by sending an answer message to the first S-CSCF 125. In this example, the answer message comprises a Cx Server-Assignment-Answer (SAA) message. An SAA message is sent in response to a SAR message.

The first S-CSCF 125 responds to the SIP REGISTER it received from the I-CSCF 115 with a SIP 200 OK message to indicate that the registration was successful. The I-CSCF 115 forwards the SIP 200 OK message to the UE 105 via the P-CSCF 110.

In practice, registration of the user may also involve an authentication flow to confirm that the UE 105 is properly acting on behalf of the user, but details of the authentication flow are omitted for brevity and convenience.

Figure 3:
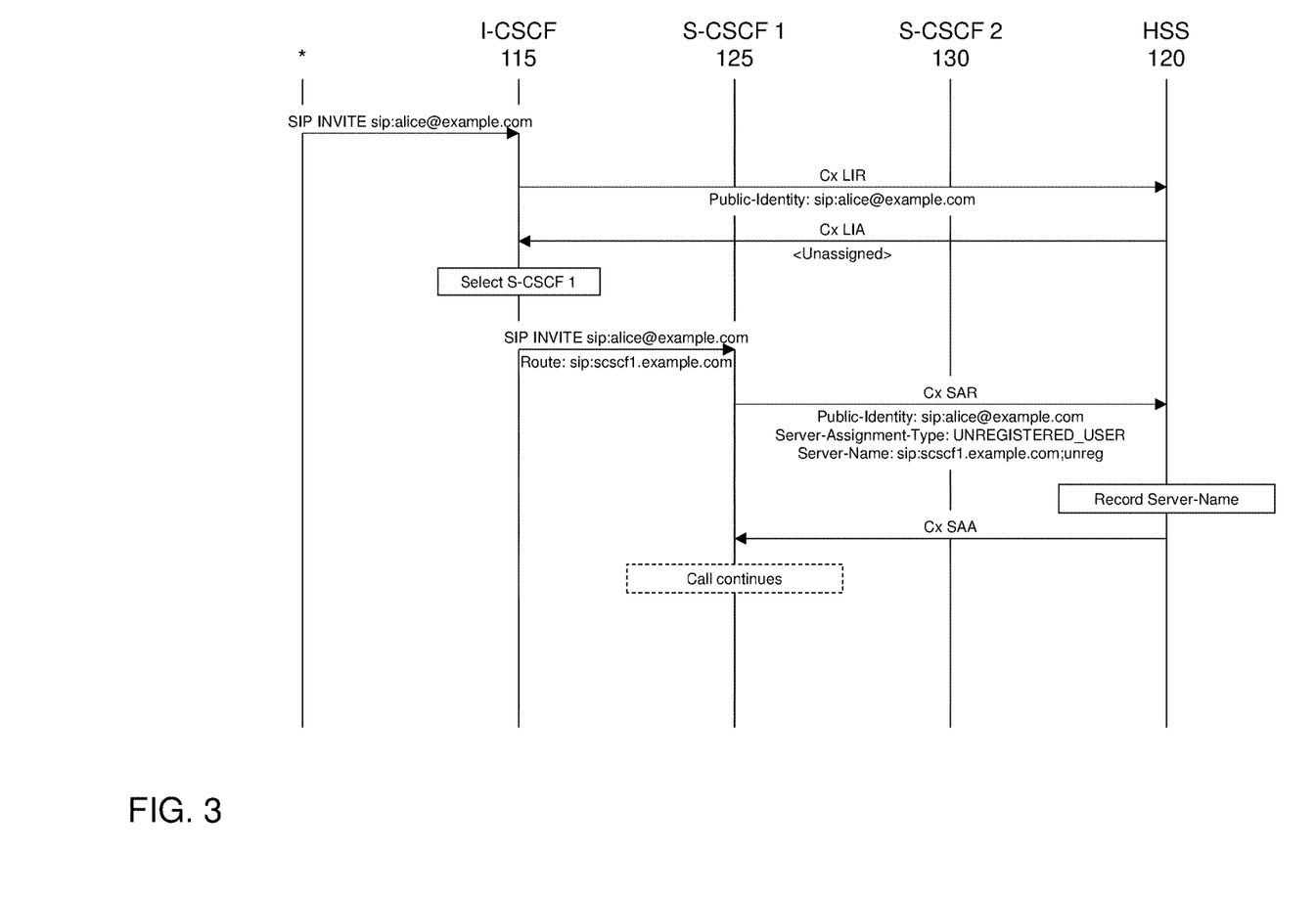
FIG. 3 shows a flow diagram depicting an example of processing data in accordance with embodiments.

Referring to FIG. 3, there is shown an example of processing data in accordance with embodiments. The example may be performed in the IMS network 100 described above with reference to FIG. 1.

The example depicted in FIG. 3 may correspond to an IMS flow in which a user goes from being unassigned to being assigned.

In the assigned state, the user is not registered. The UE 105 may not be powered on and may not be actively connected to either of the first or second S-CSCFs 125, 130 but the IMS network 100 may still provide services to the user. For example, the IMS network 110 may provide terminating services that apply even if the user is in the assigned state. Examples of such terminating services include, but are not limited to, call divert, voicemail, customized playback and incoming call management services.

The I-CSCF 115 receives a SIP INVITE message, which specifies the action that the calling party wants the called party to take. The I-CSCF 115 may, for example, receive the SIP INVITE message from a SIP trunk or another user. The SIP INVITE contains the SIP URI (the request URI) of the user which, in this example, is sip:alice@example.com. As such, the SIP INVITE message identifies the user.

The I-CSCF 115 sends a request message to the HSS 120. In this example, the request message comprises a Cx Location-Info-Request (LIR) message (or 'command'). An LIR message requests the name of the S-CSCF that is currently serving the user. A UAR message (described above with reference to FIG. 2) is used for handling registrations, whereas an LIR is used for handling terminating calls. The LIR message includes a "Public-Identity" AVP which contains the public identity of the user. In this example, the "Public-Identity" AVP contains the SIP URI of the user, namely sip:alice@example.com. As such, in this example, the LIR message identifies the user.

The HSS 120 replies to the I-CSCF 115 with an answer message. In this example, the answer message comprises a Location-Info-Answer (LIA) message (or 'command'). An LIA message is sent in response to an LIR message. In this example, the LIA message omits the Server-Name AVP (denoted "<Unassigned>" in FIG. 3) which indicates that the user is not yet assigned to a particular S-CSCF.

The I-CSCF 115 selects the first S-CSCF 125 for registration of the user and sends a SIP REGISTER message to the first S-CSCF 125 accordingly. The SIP REGISTER message sent from the I-CSCF 115 to the first S-CSCF 125 includes a "Route" header field which contains the SIP URI of the first S-CSCF 125, namely sip:scscf1.example.com.

The first S-CSCF 125 sends a request message to the HSS 120. In this example, the request message comprises a Cx SAR message. In this example, the "Public-Identity" AVP in the SAR message contains the SIP URI of the user, namely sip:alice@example.com. As such, the SAR message identifies the user. In this example, the "Server-Assignment-Type" AVP in the SAR message contains the value "UNREGISTERED_USER". The value "UNREGISTERED_USER" is used because the first S-CSCF 125 received a request for a public identity that is not registered. In this example, the "Server-Name" AVP in the SAR message contains the SIP URI of the first S-CSCF 125 with a predetermined parameter appended to the SIP URI, namely sip:scscf1.example.com;unreg. In this example, the predetermined parameter is "unreg". The first S-CSCF 125 uses this parameter to indicate that the user is assigned to but is not registered with the first S-CSCF 125. This information is also signaled by setting the value of the "Server-Assignment-Type" AVP to be "UNREGISTERED_USER". As such, in this example, the SAR message comprises an indication that the user is assigned to the first S-CSCF 125.

In terms of the SIP URI of the first S-CSCF 125, a SIP URI can be of the form "sip:user:password@host:port;uri-parameters?headers". In known user registration techniques (such as the registration flow described above with reference to FIG. 2), an S-CSCF identifies itself to an HSS using a SIP URI in the form sip:scscf.example.com, where "sip" is the scheme component of the SIP URI and "scscf.example.com" is the host component of the URI.

In accordance with examples described herein, the first S-CSCF 125 adds a URI parameters component to the SIP URI with which it identifies itself to the HSS 120. As such, in this specific example, the first S-CSCF 125 identifies itself with a SIP URI of the form "sip:scscf1.example.com;unreg" where the URI parameters component "unreg" indicates that the user is assigned, but not registered, to the first S-CSCF 125. As will be explained in more detail below, the HSS 120 can convey the fact that the user is assigned, but not registered, to the first S-CSCF 125 to the I-CSCF 115 during a registration process by conveying the SIP URI which comprises both the host and URI parameters components.

Returning to FIG. 3, the HSS 120 receives the Cx SAR message and records the SIP URI comprised in the Server-Name AVP in the SAR message against the user to which the Cx SAR message relates.

The HSS 120 replies to the Cx SAR message with an answer message. In this example the response message comprises a Cx SAA message.

The call continues to be handled by the first S-CSCF 125 to which the user is now assigned. The first S-CSCF 125 may, for example, apply call diversion or voicemail services to the call since the user is not currently registered.

Figure 4A:
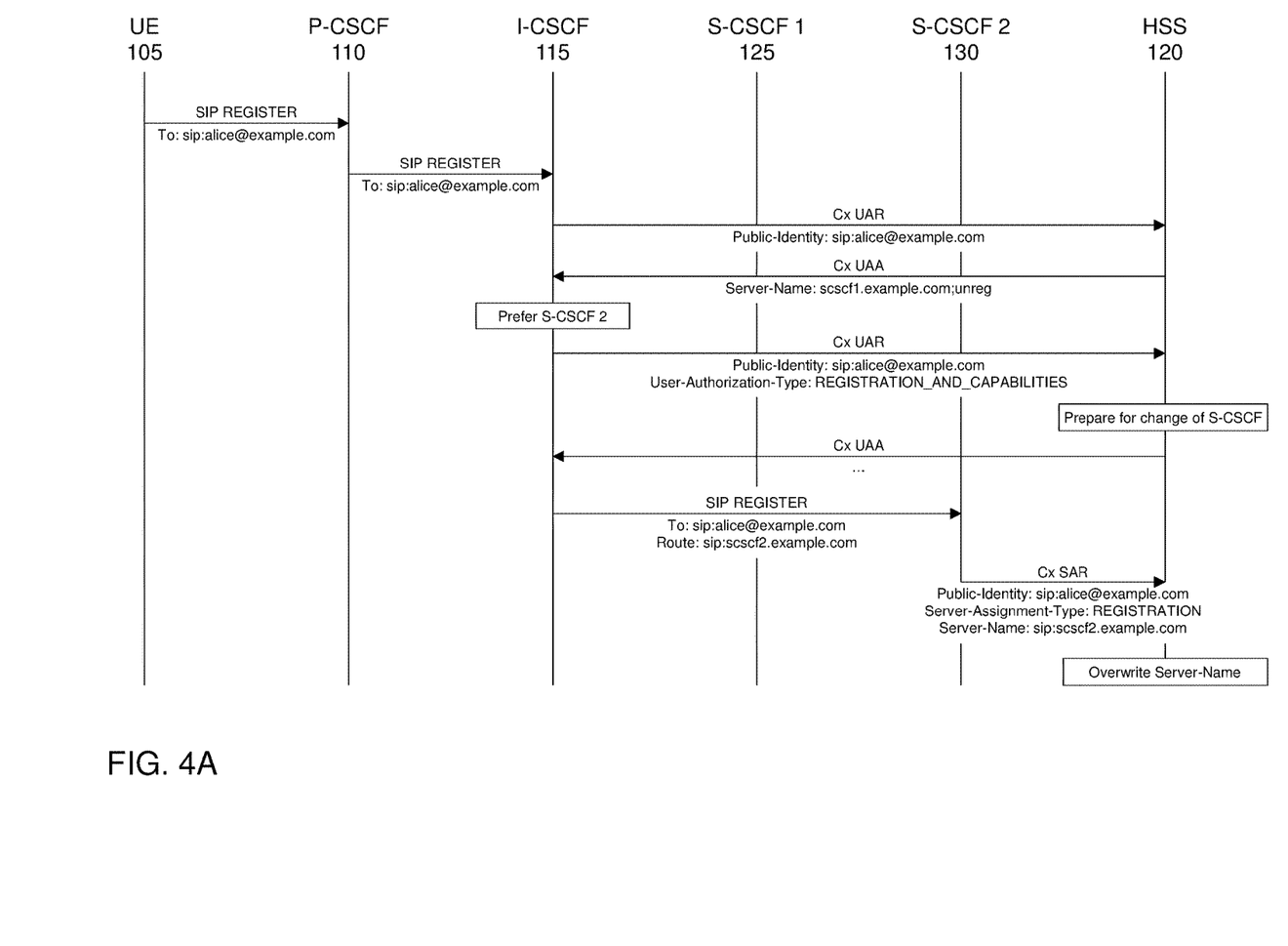
FIGS. 4A and 4B show a flow diagram depicting another example of processing data in accordance with embodiments.
Figure 4B:
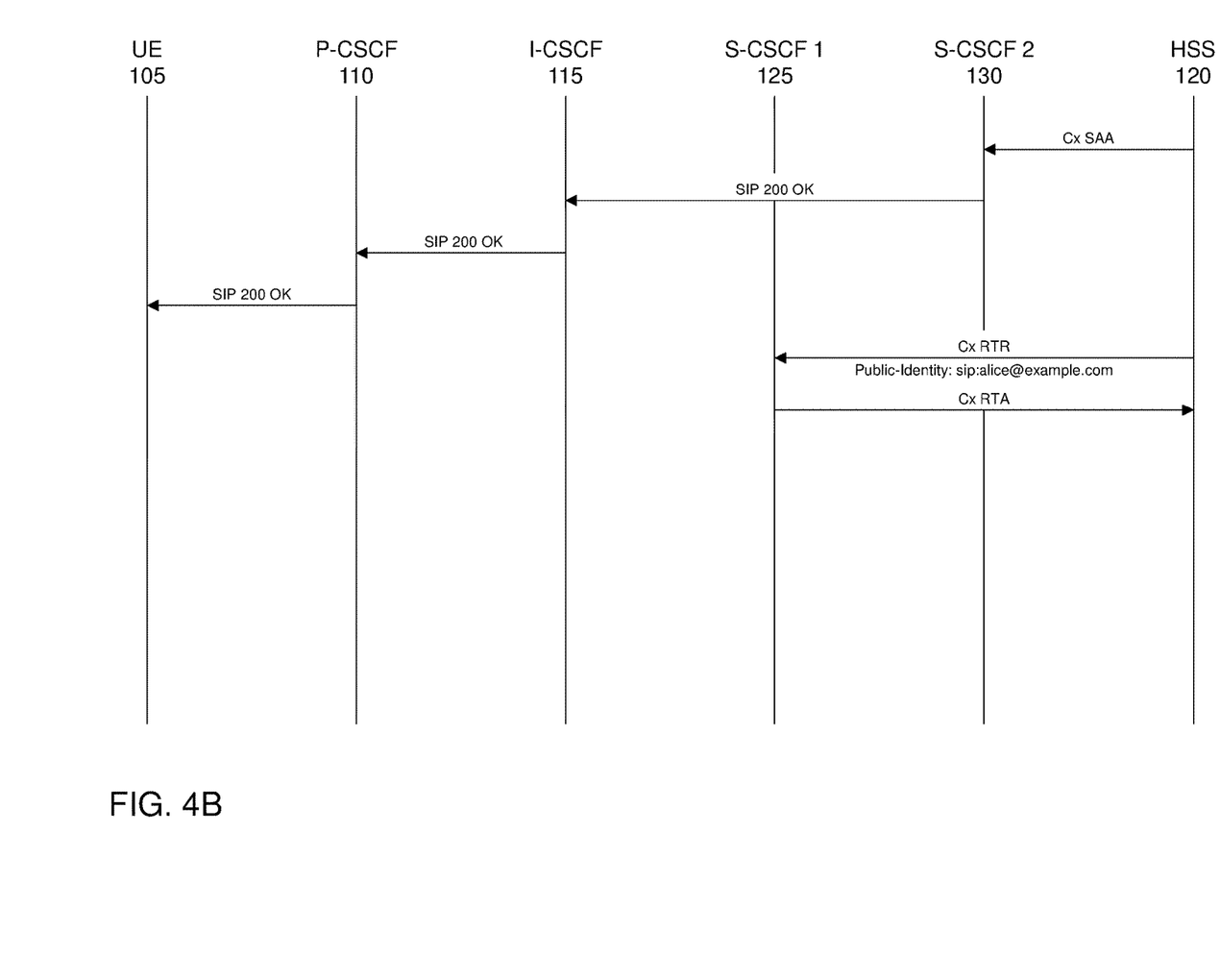

Referring to FIGS. 4A and 4B, there is shown an example of processing data in accordance with embodiments. The example may be performed in the IMS network 100 described above with reference to FIG. 1.

The example depicted in FIGS. 4A and 4B may correspond to an IMS flow in which a user goes from being assigned to being registered.

The UE 105 sends a SIP REGISTER message to the I-CSCF 115 via the P-CSCF 110 to register the user. In this example the "To" header field contains a SIP URI of the user, namely sip:alice@example.com. As such, the SIP REGISTER message identifies the user.

The I-CSCF 115 transmits a request message to the HSS 120. In this example, the request message comprises a Cx UAR message. In this example, the "Public-Identity" AVP of the Cx UAR message contains the SIP URI of the user, namely sip:alice@example.com. As such, in this example, the UAR message identifies the user.

The HSS 120 replies with an answer message. In this example, the answer message comprises a Cx UAA message. In this example, the "Server-Name" AVP of the Cx UAA message contains the SIP URI of the first S-CSCF 125 which, in this example, is sip:scscf1.example.com;unreg. As such, the Cx UAA message indicates that the user is assigned to the first S-CSCF 125. Through the SIP URI parameter "unreg", the Cx UAA message indicates that the user is not currently registered. In some examples, the HSS 120 itself does not knowingly indicate to I-CSCF 115 whether the user is registered or merely assigned. However, this information is conveyed in the Cx UAA message as it is indicated by the SIP URI parameter. As such, the HSS 120, in effect, passes through the indication from the first S-CSCF 125 to the I-CSCF 115 that the user is assigned to the first S-CSCF 125 (and not registered) by conveying that indication in the SIP URI of the first S-CSCF 125. As such, in this example, the UAA message comprises an indication that the user is assigned to and not registered to the first S-CSCF 125.

Since the user is assigned to the first S-CSCF 125 but is not registered with the first S-CSCF 125, the I-CSCF 115 can register the user to an S-CSCF other than the first S-CSCF 125 without impacting the service to the user. In other words, the I-CSCF 115 can change S-CSCF in relation to the user at this stage. In this example, the I-CSCF 115 decides that the second S-CSCF 130 is a preferred S-CSCF for registration of the user. This may, for example, be based on local (or other) policy.

As such, the I-CSCF 115 performs a predetermined action in response to an answer message from the HSS 120, namely the UAA message, indicating that the user is assigned to the first S-CSCF 120. In this example, performing the predetermined action comprises determining whether the first S-CSCF 125 or the second S-CSCF 130 is a preferred S-CSCF for registration of the user. In this example, the result of the determination is that the second S-CSCF 130 is a preferred S-CSCF.

As explained above, in some known techniques, a user is registered to the S-CSCF to which they are initially assigned. The S-CSCF to which the user is assigned may already have a service profile for the user, for example Initial Filter Criteria (iFC) indicating which Application Servers (ASs) should be used for a given user and in which circumstances. As such, registering a user with the same S-CSCF to which they are assigned may result in the S-CSCF not having to query an HSS for the service profile following registration of the user with the S-CSCF. However, the S-CSCF to which the user is assigned may not be the preferred S-CSCF for registration for the user, for example if the S-CSCF to which the user is assigned is not local to the user when the user registers with the IMS network. As such, an S-CSCF other than the one to which the user is assigned may be preferable in terms of being more local to the user and providing a better user experience.

Returning now to FIG. 4A, the I-CSCF 115 sends a request message to the HSS 120. In this example, the request message comprises a UAR message. The UAR message prepares the HSS 120 for a change of S-CSCF from the first S-CSCF 125 to the second S-CSCF 130. In general, an HSS 120 may reject a change of S-CSCF. However, in this example, the "User-Authorization-Type" AVP of the UAR message, which indicates the type of user authorization being performed, contains a value of "REGISTRATION_AND_CAPABILITIES". This value is used in case of initial registration or re-registration and also when an I-CSCF explicitly requests S-CSCF capability information from an HSS (for example when the HSS thinks the user is assigned but the I-CSCF cannot route to that S-CSCF for some reason). An I-CSCF also uses this value when the current S-CSCF of a user, which is stored in an HSS, cannot be contacted and a new S-CSCF needs to be selected. As such, the use of this value causes the HSS 120 to determine that the first S-CSCF 125 might be unreachable and so prepares for the change of S-CSCF.

The HSS 120 sends an answer message to the I-CSCF 115. In this example, the answer message comprises a Cx UAA message.

The I-CSCF 115 forwards the SIP REGISTER originally received from the P-CSCF 110 to the second S-CSCF 130, which is the preferred S-CSCF for registration of the user. The SIP REGISTER message includes a "Route" header field which contains the SIP URI of the second S-CSCF 130, namely sip:scscf2.example.com.

The second S-CSCF 130 processes the SIP REGISTER received from the I-CSCF 115 and transmits a request message to the HSS 120 to inform the HSS 120 that the user is now registered with the second S-CSCF 130. In this example, the request message comprises an SAR message. In this example, the "Public-Identity" AVP of the SAR message contains the SIP URI of the user, namely sip:alice@example.com. As such, the SAR message identifies the user. In this example, the "Server-Assignment-Type" AVP contains the value "REGISTRATION", which means that the SAR message is being generated as a first registration of an identity. In this example, the "Server-Name" AVP contains the SIP URI of the second S-CSCF 130, namely sip:scscf2.example.com. In this example, the absence of the predetermined parameter "unreg" in the SIP URI of the second S-CSCF 130 indicates that the user is not assigned to the second S-CSCF 130 (on the basis that the user is now registered with the second S-CSCF 130).

The HSS 120 overwrites the Server-Name value currently stored in its database, namely sip:scscf1.example.com;unreg with the SIP URI of the second S-CSCF 130, namely sip:scscf2.example.com.

The HSS 120 replies to the SAR message received from the second S-CSCF 130 with an answer message. In this example, the answer message comprises an SAA message.

The second S-CSCF 130 responds to the SIP REGISTER message it received from the I-CSCF 115 with a SIP 200 OK message. The I-CSCF 115 forwards the SIP 200 OK message to the UE 105 via the P-CSCF 110.

Separately, the HSS 120 notifies the first S-CSCF 125 that the user is no longer assigned to it by sending a request message to the first S-CSCF 125. In this example, the request message comprises a Cx Registration-Termination-Request (RTR) message. An RTR message requests de-registration of a user. In this example, the RTR message includes a "Public-Identity" AVP containing the SIP URI of the user, namely sip:alice@example.com. As such, the RTR message identifies the user. On receiving the RTR message, the first S-CSCF 125 is notified that the user has already been de-assigned from this S-CSCF.

The first S-CSCF 125 responds to the RTR message with an answer message. In this example, the answer message comprises a Registration-Termination-Answer (RTA) message. An RTA message is sent in response to an RTR message.

As such, in accordance with examples described herein, when a user is assigned to (and not registered with) an S-CSCF, the S-CSCF to which the user is assigned appends a parameter (for example "unreg") onto its SIP URI, which it signals to an HSS. When a user registers, an I-CSCF queries the HSS and receives the SIP URI signaled by the S-CSCF to which the user is assigned. The I-CSCF notices the "unreg" parameter in the SIP URI and knows that the user is therefore only assigned (and not registered) to the S-CSCF concerned. As such, the I-CSCF can determine that the user can be moved to another, more suitable, S-CSCF for registration if appropriate. The I-CSCF may check its policy to determine whether there is a better S-CSCF than the S-CSCF to which the user is assigned. If so, the I-CSCF pretends that the S-CSCF to which the user is as signed is unreachable, sending a UAR (REGISTRATION_AND_CAPABILITIES) message to the HSS and forwarding the SIP REGISTER to which the registration of the user relates to the new, preferred S-CSCF. The new S-CSCF registers this user and updates the HSS accordingly.

In accordance with examples described herein, an S-CSCF sends SARs to update its SIP URI when it moves from being assigned (and not registered) to being registered with respect to a given user (for example following a SIP REGISTER message) and when it moves from being registered to assigned with respect to a given user (for example if the HSS sends an RTR message).

Examples described herein may be particularly effective where an I-CSCF and a previous-owning S-CSCF both implement the techniques described herein, for example where both are provided by the same vendor. For example, a user may be migrated from one S-CSCF to another S-CSCF more promptly than using other approaches. Further, a relatively small number of signaling flows may be used compared to other possible solutions. Yet further, the techniques described herein may allow for improved location of an S-CSCF to which a user is registered.

In embodiments described above in relation to FIGS. 4A and 4B, I-CSCF 115 performs a predetermined action in response to an answer message from HSS 120, namely the UAA message, indicating that the user is assigned and not registered to the first S-CSCF 120.

In alternative embodiments, the answer message from HSS 120, indicates that the user is registered to the first S-CSCF 120. In such alternative embodiments, it may be assumed that it is not safe to move the user to the new S-CSCF, for example because they could have a brief loss of service as the move happens. There are two main scenarios in which this may happen. Firstly, there are two UEs registering for the same user in different places, such that although the location may not be optimal for one UE, it may well be for the other UE. Secondly, one UE has left one S-CSCF locality without un-registering and moved to a new S-CSCF locality before their registration has timed out.

In embodiments described above in relation to FIGS. 4A and 4B, I-CSCF 115 performs a predetermined action in response to an answer message from HSS 120, namely the UAA message, indicating that the user is assigned to the first S-CSCF 120. In such embodiments, performing the predetermined action comprises determining whether the first S-CSCF 125 or the second S-CSCF 130 is a preferred S-CSCF for registration of the user. In embodiments described above, the result of the determination is that the second S-CSCF 130 is a preferred S-CSCF.

In alternative embodiments, the result of the determination is that the first S-CSCF 125 is a preferred S-CSCF (i.e. the second S-CSCF 130 is not a preferred S-CSCF). In such embodiments where the I-CSCF 115 prefers the first S-CSCF 125, the I-CSCF 115 transmits a SIP REGISTER message to the first S-CSCF 125 with the Route header field set to sip:scscf1.example.com. In some such embodiments, one or more of the I-CSCF 115 and the first S-CSCF 125 update the HSS 120 to store a Server-Name SIP URI without the "unreg" parameter. In some embodiments, this is carried out by the I-CSCF 115 sending the UAR(REGISTRATION_AND_CAPABILITIES) to the HSS 120 anyway (even though the only thing it wants to change is the parameter, not the host). In other embodiments, this is carried out by the S-CSCF de-assigning and then re-assigning the user at the HSS 120. In further embodiments, the HSS 120 may permit a Server-Name change that only changes SIP URI parameters.

The systems described herein may be comprised in or implemented in apparatus comprising a processor or processing system. The processing system may comprise one or more processors and/or memory. Each system, entity or function as described in relation to any of the examples described herein may similarly comprise a processor and/or processing system or may be comprised in apparatus comprising a processor and/or processing system. One or more of the aspects of the embodiments described herein with reference to the drawings comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

Various measures (for example methods, systems and non-transitory computer-readable storage media) are provided to process data in an IMS network. The IMS network comprises an HSS, an I-CSCF and an S-CSCF. The I-CSCF transmits a request message to the HSS. The request message identifies a user of the IMS network. The I-CSCF receives an answer message from the HSS. The answer message comprises an indication either that the user is assigned and not registered to the S-CSCF, or that the user is registered with the S-CSCF. The I-CSCF performs a predetermined action in response to the answer message indicating that the user is assigned to the S-CSCF.

The answer message may comprise a URI of the S-CSCF and the indication may be comprised in the URI.

The URI may comprise a host component and a URI parameters component and the indication may be comprised in the URI parameters component.

The indication may be comprised in a parameter appended to the URI.

The request message may comprise a UAR message. The answer message may comprise a UAA message.

The I-CSCF may transmit the request message to the HSS in response to the I-CSCF receiving a registration message associated with the user.

The IMS network may comprise a further S-CSCF and the performing of the predetermined action may comprise determining whether the S-CSCF or the further S-CSCF is a preferred S-CSCF for registration of the user.

The I-CSCF may transmit a reassignment preparation message to the HSS in response to the I-CSCF determining that the further S-SCSF is the preferred S-CSCF.

The reassignment preparation message may comprise a UAR message.

The UAR message may comprise a User-Authorization-Type AVP having a value of REGISTRATION_AND_CAPABILITIES.

The I-CSCF may transmit a registration message identifying the user to the further S-CSCF.

Various measures (for example methods, systems and non-transitory computer-readable storage media) are provided to process data in an IMS network. The IMS network comprises an HSS, an I-CSCF and an S-CSCF. The S-CSCF generates a message identifying a user of the IMS network and comprising an indication either: that the user is assigned and not registered to the S-CSCF, or that the user is registered with the S-CSCF. The message comprises a URI of the S-CSCF and the indication is comprised in the URI. The S-CSCF transmits the generated message to the HSS.

The URI may comprise a host component and a URI parameters component and the indication may be comprised in the URI parameters component.

The indication may be comprised in a parameter appended to the URI.

The S-CSCF may generate the message in response to the S-CSCF determining that the user has changed from being one of (i) assigned and not registered to the S-CSCF and (ii) registered with the S-CSCF to being the other of (i) assigned and not registered to the S-CSCF and (ii) registered with the S-CSCF.

The message may comprise an SAR message.

Various measures (for example methods, systems and non-transitory computer-readable storage media) are provided to process data in an IMS network. The IMS network comprises an HSS, an I-CSCF and an S-CSCF. The HSS receives a request message from the I-CSCF. The request message identifies a user of the IMS network. The HSS processes the request message. The HSS transmits an answer message to the I-CSCF based on the processing of the request message. The answer message comprises an indication either that the user is assigned to the S-CSCF or that the user is registered with the S-CSCF.

The answer message may comprise a URI of the S-CSCF and the indication may be comprised in the URI.

The URI may comprise a host component and a URI parameters component and the indication may be comprised in the URI parameters component.

The indication may be comprised in a parameter appended to the URI.

In processing the request message, the HSS may perform a lookup in a database using the identity of the user and retrieve the indication in response to the lookup.

The request message may comprise a UAR message and the answer message may comprise a UAA message.

Various measures (for example methods, systems and non-transitory computer-readable storage media) are provided to process data in an IMS network. The IMS network comprises an HSS, an I-CSCF and an S-CSCF. The HSS receives a message identifying a user of the IMS network and an indication either that the user is assigned and not registered to the S-CSCF or that the user is registered with the S-CSCF. The message comprises a URI of the S-CSCF and the indication is comprised in the URI. The indication is stored in association with data identifying the user.

The URI may comprise a host component and a URI parameters component and the indication may be comprised in the URI parameters component.

The indication may be comprised in a parameter appended to the URI.

The message may comprise an SAR message.

Various measures (for example methods, systems and non-transitory computer-readable storage media) are provided to control an HSS in an IMS network. The IMS network comprises the HSS, an I-CSCF and an S-CSCF. The HSS transmits a message to the I-CSCF via a Cx interface between the HSS and the I-CSCF. The message comprises an indication either that a user of the IMS network is assigned and not registered to the S-CSCF or that the user is registered with the S-CSCF.

Various measures (for example methods, systems and non-transitory computer-readable storage media) are provided to control an I-CSCF in an IMS network. The IMS network comprises the I-CSCF, an HSS and an S-CSCF. The I-CSCF processes a message received by the I-CSCF from the HSS via a Cx interface between the HSS and the I-CSCF. The message comprises an indication either that a user of the IMS network is assigned and not registered to the S-CSCF or that the user is registered with the S-CSCF.

Various measures (for example methods, systems and non-transitory computer-readable storage media) are provided to control an S-CSCF in an IMS network. The IMS network comprises the S-CSCF, an HSS and an I-CSCF. The S-CSCF transmits a message to the HSS via a Cx interface between the S-CSCF and the HSS. The message comprises a URI of the S-CSCF. The URI comprises an indication either that a user of the IMS network is assigned and not registered to the S-CSCF or that the user is registered with the S-CSCF.

Various measures (for example methods, systems and non-transitory computer-readable storage media) are provided to control an HSS in an IMS network. The IMS network comprises the HSS, an I-CSCF and an S-CSCF. The HSS processes a message received by the HSS from the S-CSCF via a Cx interface between the S-CSCF and the HSS. The message comprises a URI of the S-CSCF. The URI comprises an indication either that a user of the IMS network is assigned and not registered to the S-CSCF or that the user is registered with the S-CSCF.

Various measures (for example methods, systems and non-transitory computer-readable storage media) are provided in which an I-CSCF and/or an HSS in an IMS network processes a message indicating either that a user of the IMS network is assigned and not registered to an S-CSCF in the IMS network or that the user is registered with the S-CSCF. The processing of the message involves the message being transmitted by the HSS to the I-CSCF and/or the message being received by the I-CSCF from the HSS.

Various measures (for example methods, systems and non-transitory computer-readable storage media) are provided in which an S-CSCF and/or an HSS in an IMS network processes a message comprising a URI of the S-CSCF. The URI indicates either that a user of the IMS network is assigned and not registered to the S-CSCF or that the user is registered with the S-CSCF. The processing of the message involves the message being transmitted by the S-CSCF to the HSS and/or the message being received by the HSS from the S-CSCF.

Various measures (for example methods, systems and non-transitory computer-readable storage media) are provided in which an S-CSCF in an IMS network determines whether a given user of the IMS network is assigned and not registered to the S-CSCF or is registered with the S-CSCF and generates a message comprising a URI of the S-CSCF. The generating of the message involves the S-CSCF including a host component and a predetermined URI parameters component in the URI when the determining indicates that the given user of the IMS network is assigned and not registered to the S-CSCF. The generating of the message involves the S-CSCF including the host component in the URI and either omitting the predetermined URI parameters component from the URI or including a different URI parameters component (different from the above-mentioned predetermined URI parameters component) in the URI when the determining indicates that the given user of the IMS network is registered with the S-CSCF.

Various measures (for example methods, systems and non-transitory computer-readable storage media) are provided in which an I-CSCF in an IMS network receives a message comprising a URI of an S-CSCF in the IMS network. The URI comprises at least a host component. The I-CSCF parses the URI to determine whether or not the URI comprises a predetermined URI parameters component. The I-CSCF determines whether a given user of the IMS network is assigned and not registered to the S-CSCF or is registered with the S-CSCF based on a result of the parsing.

Various measures (for example methods, systems and non-transitory computer-readable storage media) are provided in which an S-CSCF in an IMS network signals a change from a user of the IMS network being one of (i) assigned and not registered to an S-CSCF and (ii) registered with the S-CSCF to the user being the other of (i) assigned and not registered to the S-CSCF and (ii) registered with the S-CSCF by sending a message to an HSS in the IMS network in which a URI of the S-CSCF comprised in the message indicates whether the user (i) is assigned and not registered to the S-CSCF or (ii) is registered with the S-CSCF.

For the avoidance of doubt, references herein to a user being "assigned" to an S-CSCF relate to the user being assigned but not registered to the S-CSCF and references to a user being "registered" with an S-CSCF relate to the user being registered to the S-CSCF. Where a user is registered to an S-CSCF, the user is also (implicitly) assigned to that S-CSCF.

The above embodiments are to be understood as illustrative examples. Further embodiments are envisaged.

Examples are described above in which an assigned or registered state is indicated in a URI parameters component of a SIP URI. In some examples, the user or the host components could be modified to indicate this. For example, "sip:unreg@scscf1.example.com" or "sip:unreg.scscf1.example.com" could be used to indicate that the user is assigned to the first S-CSCF 125. In the latter case, the DNS is configured so that unreg.scscf1.example.com resolves to the same host as scscf.example.com.

In examples described above, the HSS conveys an indication of whether a user is assigned to or registered with an S-CSCF to an I-CSCF via an indication in a SIP URI. This means that a standard-compliant HSS may be used without further customization. In other examples, the HSS could convey an indication of whether a user is assigned to or registered with an S-CSCF to an I-CSCF in another manner (for example in another element of a message), though the HSS may not be standard-compliant or may need to be customized.

Examples are described above in relation to an IMS network that comprises two S-CSCFs. Embodiments equally apply to IMS networks that comprise more than two S-CSCFs (including examples where an I-CSCF selects a preferred S-CSCF from a pool of more than two S-CSCFs.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing data in an IP Multimedia Subsystem (IMS) network, the IMS network comprising a Home Subscriber Server (HSS), an Interrogating Call Session Control Function (I-CSCF) and a Serving Call Session Control Function (S-CSCF), the method comprising:
   at the I-CSCF, transmitting a request message to the HSS, the request message identifying a user of the IMS network, wherein the user is: (i) in an unassigned state, (ii) in an assigned and not registered state, or (iii) in a registered state;
   at the I-CSCF, receiving an answer message from the HSS, the answer message comprising a state indication, indicating a state of the user, either:
      that the user is assigned and not registered to the S-CSCF, or
      that the user is registered with the S-CSCF,
      wherein the answer message comprises a Uniform Resource Identifier (URI) of the S-CSCF and wherein the state indication, indicating the state of the user, is comprised in the URI; and
   at the I-CSCF, performing a predetermined action in response to the answer message indicating that the user is assigned and not registered to the S-CSCF.

2. The method of claim 1, wherein the URI comprises a host component and a URI parameters component, and wherein the state indication, indicating the state of the user, is comprised in the URI parameters component.

3. The method of claim 1, wherein the state indication, indicating the state of the user, is comprised in a parameter appended to the URI.

4. The method of claim 1, wherein the request message comprises a User-Authorization-Request (UAR) message and the answer message comprises a User-Authorization-Answer (UAA) message.

5. The method of claim 1, wherein the I-CSCF transmits the request message to the HSS in response to the I-CSCF receiving a registration message associated with the user.

6. The method of claim 1, wherein the IMS network comprises a further S-CSCF and wherein said performing the predetermined action comprises determining whether the S-CSCF or the further S-CSCF is a preferred S-CSCF for registration of the user.

7. The method of claim 6, wherein the method comprises the I-CSCF transmitting a reassignment preparation message to the HSS in response to the I-CSCF determining that the further S-SCSF is the preferred S-CSCF.

8. The method of claim 7, wherein the reassignment preparation message comprises a UAR message.

9. The method of claim 8, wherein the UAR message comprises a User-Authorization -Type Attribute-Value Pair (AVP) having a value of REGISTRATION_AND_CAPABILITIES.

10. The method according to claim 6, wherein the method comprises the I-CSCF transmitting a registration message identifying the user to the further S-CSCF.

11. A system for processing data in an IMS network, the IMS network comprising an HSS, an I-CSCF and an S-CSCF, the system comprising at least one memory including computer program code and at least one processor in data communication with the at least one memory, wherein the at least one processor is configured to, at the I-CSCF:
   transmit a request message to the HSS, the request message identifying a user of the IMS network, wherein the user is: (i) in an unassigned state, (ii) in an assigned and not registered state, or (iii) in a registered state;
receive an answer message from the HSS, the answer message comprising a state indication, indicating a state of the user, either:
that the user is assigned and not registered to the S-CSCF, or
that the user is registered with the S-CSCF, wherein the answer message comprises a URI of the S-CSCF and wherein the state indication, indicating the state of the user, is comprised in the URI-; and
perform a predetermined action in response to the answer message indicating that the user is assigned and not registered to the S-CSCF.

12. A method of processing data in an IMS network, the IMS network comprising an HSS, an I-CSCF and an S-CSCF, a user of the IMS network being: (i) in an unassigned state, (ii) in an assigned and not registered state, or (iii) in a registered state, the method comprising:
at the S-CSCF, generating a first message identifying the user of the IMS network and comprising a state indication, indicating the state of the user, either:
that the user is assigned and not registered to the S-CSCF, or
that the user is registered with the S-CSCF, wherein the message comprises a URI of the S-CSCF and wherein the state indication, indicating a state of the user, is comprised in the URI;
at the S-CSCF, transmitting the generated message to the HSS; and
at the I-CSCF, receiving a second message from the HSS, the message received from the HSS comprising the URI of the S-CSCF, the state indication, indicating the state of the user, being comprised in the URI.

13. The method of claim 12, wherein the URI comprises a host component and a URI parameters component and wherein the state indication, indicating the state of the user, is comprised in the URI parameters component.

14. The method of claim 12, wherein the state indication, indicating the state of the user, is comprised in a parameter appended to the URI.

15. The method of claim 12, wherein the S-CSCF generates the message that is transmitted to the HSS in response to the S-CSCF determining that the user has changed from being one of (i) assigned and not registered to the S-CSCF and (ii) registered with the S-CSCF to being the other of (i) assigned and not registered to the S-CSCF and (ii) registered with the S-CSCF.

16. The method of claim 12, wherein the generated message that is transmitted to the HSS comprises an SAR message.

* * * * *